(12) United States Patent
Lee

(10) Patent No.: US 12,314,151 B2
(45) Date of Patent: May 27, 2025

(54) DISPLAY DEVICE AND OPERATING METHOD THEREOF

(71) Applicant: LG ELECTRONICS INC., Seoul (KR)

(72) Inventor: Sin Jae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/322,069

(22) Filed: May 23, 2023

(65) Prior Publication Data

US 2024/0345933 A1 Oct. 17, 2024

(30) Foreign Application Priority Data

Apr. 11, 2023 (KR) ........................ 10-2023-0047535

(51) Int. Cl.
  *G06F 11/30* (2006.01)
  *G06F 1/16* (2006.01)
  *G06F 3/02* (2006.01)
  *G06F 3/06* (2006.01)
  *G06F 9/445* (2018.01)

(52) U.S. Cl.
  CPC ........ *G06F 11/3055* (2013.01); *G06F 1/1698* (2013.01); *G06F 3/0227* (2013.01); *G06F 3/0634* (2013.01); *G06F 9/44589* (2013.01)

(58) Field of Classification Search
  CPC .. G06F 11/3055; G06F 1/1698; G06F 3/0227; G06F 3/0634; G06F 9/44589
  See application file for complete search history.

(56) References Cited

U.S. PATENT DOCUMENTS

| | | | |
|---|---|---|---|
| 2010/0302154 A1 | 12/2010 | Lee et al. | |
| 2013/0205212 A1* | 8/2013 | Sinha | H04N 21/432 715/719 |
| 2014/0273844 A1* | 9/2014 | Castillo | H04B 5/48 455/41.2 |

(Continued)

FOREIGN PATENT DOCUMENTS

| | | |
|---|---|---|
| KR | 10-2020-0022040 | 3/2020 |
| KR | 10-2020-0131559 | 11/2020 |

(Continued)

OTHER PUBLICATIONS

German Patent and Trademark Office, German Patent Application No. 102023121272.9, Office Action dated Oct. 30, 2024, 4 pages.

(Continued)

*Primary Examiner* — Benjamin M Thieu
(74) *Attorney, Agent, or Firm* — LEE, HONG, DEGERMAN, KANG & WAIMEY

(57) ABSTRACT

A display device according to an embodiment of the present disclosure comprising a network interface connected to a network, an external device interface connected to at least one external device, a wireless communication interface configured to perform pairing with a remote control device and a controller configured to obtain a state of the network as a normal state or an abnormal state, count the number of times the state of the network is obtained as the abnormal state, and maintain or change a control mode for controlling the external device, based on the number of counts, wherein the control mode includes an IR mode and a network.

11 Claims, 7 Drawing Sheets

(56) References Cited

U.S. PATENT DOCUMENTS

| | | | | |
|---|---|---|---|---|
| 2015/0036573 | A1* | 2/2015 | Malik | G08C 17/02 |
| | | | | 370/311 |
| 2015/0067729 | A1* | 3/2015 | Yoon | H04N 21/43615 |
| | | | | 725/37 |
| 2015/0077021 | A1* | 3/2015 | Smith | H01H 9/0271 |
| | | | | 315/362 |
| 2019/0043345 | A1* | 2/2019 | Owrang | G08C 23/04 |
| 2019/0280888 | A1* | 9/2019 | Garschhammer | G08C 17/02 |
| 2020/0204613 | A1* | 6/2020 | Hatambeiki | G05B 15/02 |
| 2021/0303252 | A1* | 9/2021 | Bae | H04N 21/44004 |
| 2022/0020314 | A1 | 1/2022 | Lee et al. | |
| 2022/0271961 | A1* | 8/2022 | Prabhakara | H04L 12/185 |
| 2023/0039861 | A1* | 2/2023 | Wang | H04N 21/43615 |
| 2023/0139356 | A1* | 5/2023 | Sallas | H04N 21/42222 |
| | | | | 348/734 |

FOREIGN PATENT DOCUMENTS

| | | |
|---|---|---|
| KR | 10-2021-0121777 | 10/2021 |
| KR | 10-2021-0130066 | 10/2021 |

OTHER PUBLICATIONS

Korean Intellectual Property Office Application No. 10-2023-0047535, Notice of Allowance dated Dec. 30, 2024, 2 pages.

\* cited by examiner

DISPLAY DEVICE AND OPERATING METHOD THEREOF

CROSS-REFERENCE TO RELATED APPLICATION(S)

Pursuant to 35 U.S.C. § 119 (a), this application claims the benefit of earlier filing date and right of priority to Korean Patent Application No. 10-2023-0047535, filed on Apr. 11, 2023, the contents of which are all hereby incorporated by reference herein in their entireties.

BACKGROUND

The present disclosure relates to a display device. More particularly, the present disclosure relates to a display device for automatically providing a control method of an optimized external device.

Digital TV services using wired or wireless communication networks are becoming common. Digital TV services are capable of providing various services that could not be provided by the existing analog broadcasting services.

For example, Internet Protocol Television (IPTV) and smart TV services, which are types of digital TV services, provide interactivity so that users can actively select the types of watching programs, the watching time, and the like. The IPTV and smart TV services can provide various additional services, such as Internet search, home shopping, and online games, based on such interactivity.

The TV may receive and output content from an external device such as a set-top box. Accordingly, there are cases where the set-top box as well as the TV needs to be controlled. In this case, it is possible to control both the TV and the set-top box by using a universal remote control device without a separate remote control device for controlling the set-top box.

The set-top box may be controlled in various ways according to the control mode of the TV.

For example, the TV may control the set-top box by transmitting a key code to the universal remote control device and transmitting an infrared (IR) signal to the set-top box. Alternatively, the TV may control the set-top box by directly transmitting the key code to a network to which the set-top box is connected.

The most efficient method for controlling the set-top box may be different depending on the network environment around the TV. However, it may be inconvenient for the user to directly change the control mode while checking the surrounding environment of the TV.

SUMMARY

The present disclosure aims to automatically provide the most suitable control mode for controlling an external device when using a universal remote control device.

The present disclosure aims to minimize errors caused by frequent changes in control modes for controlling external devices when using a universal remote control device.

A display device according to an embodiment of the present disclosure may automatically provide an optimized control mode by changing a control mode according to a network environment.

A display device according to an embodiment of the present disclosure may stably control a set-top box by maintaining or changing a control mode according to a network environment.

DETAILED DESCRIPTION OF THE EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen. Alternatively, a more user-friendly interface such as a spatial remote control may be provided. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
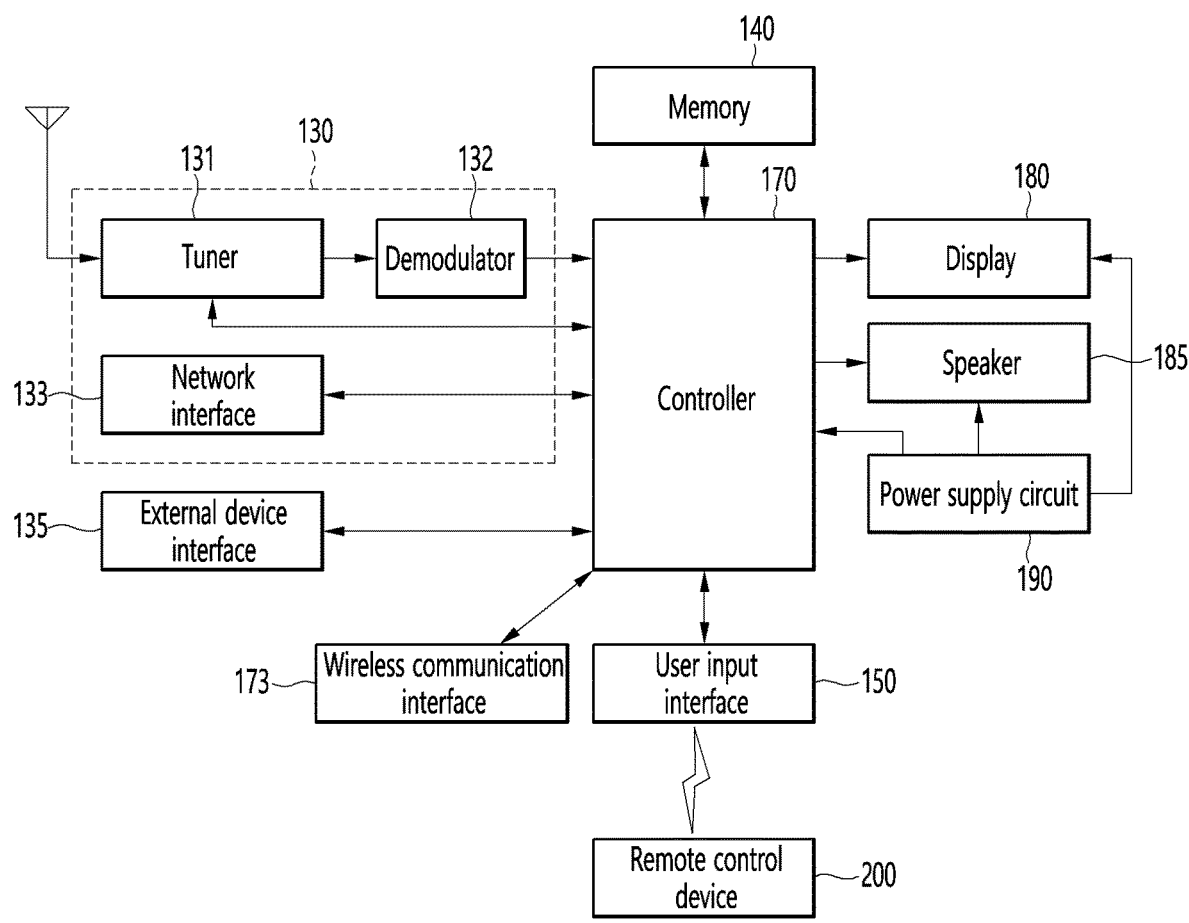
FIG. 1 is a block diagram illustrating a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the other display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the speaker 185.

Next, a remote control device according to an embodiment of the present disclosure will be described with reference to FIGS. 2 to 3.

Figure 2:
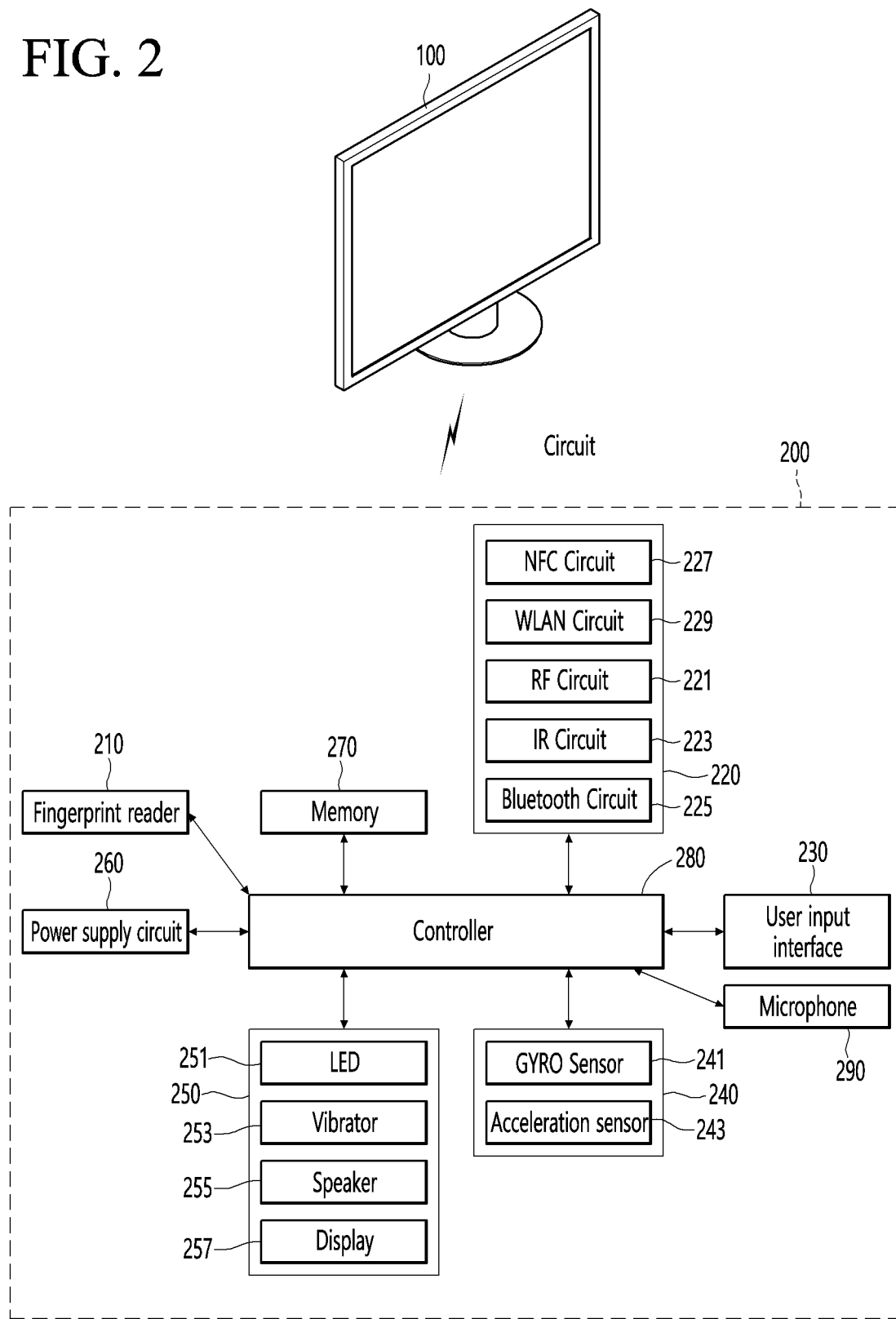
FIG. 2 is a block diagram of a remote control device according to an embodiment of the present disclosure.
Figure 3:
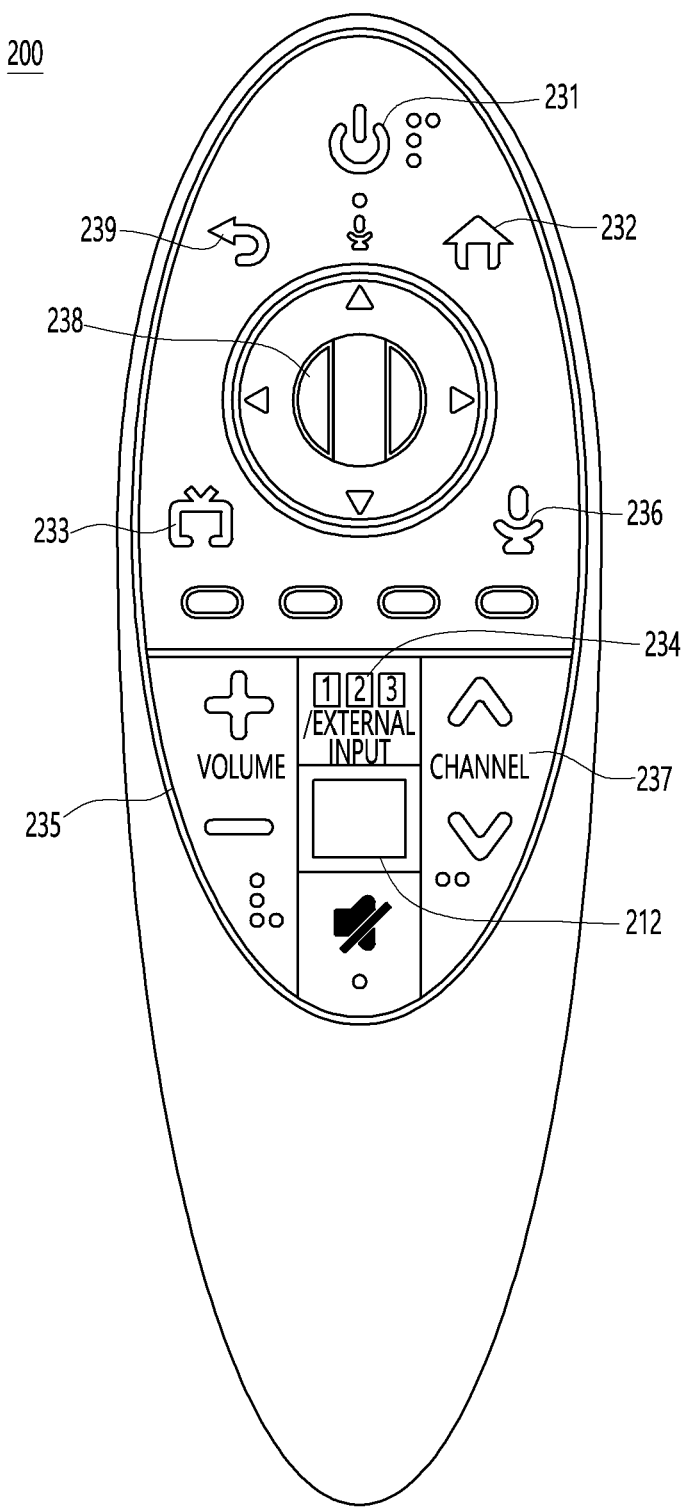
FIG. 3 shows an example of an actual configuration of a remote control device according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the Bluetooth circuit 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the Bluetooth circuit 225.

Also, the microphone 290 of the remote control device 200 may obtain a speech.

A plurality of microphones 290 may be provided.

Next, a description will be given referring to FIG. 4.

Figure 4:
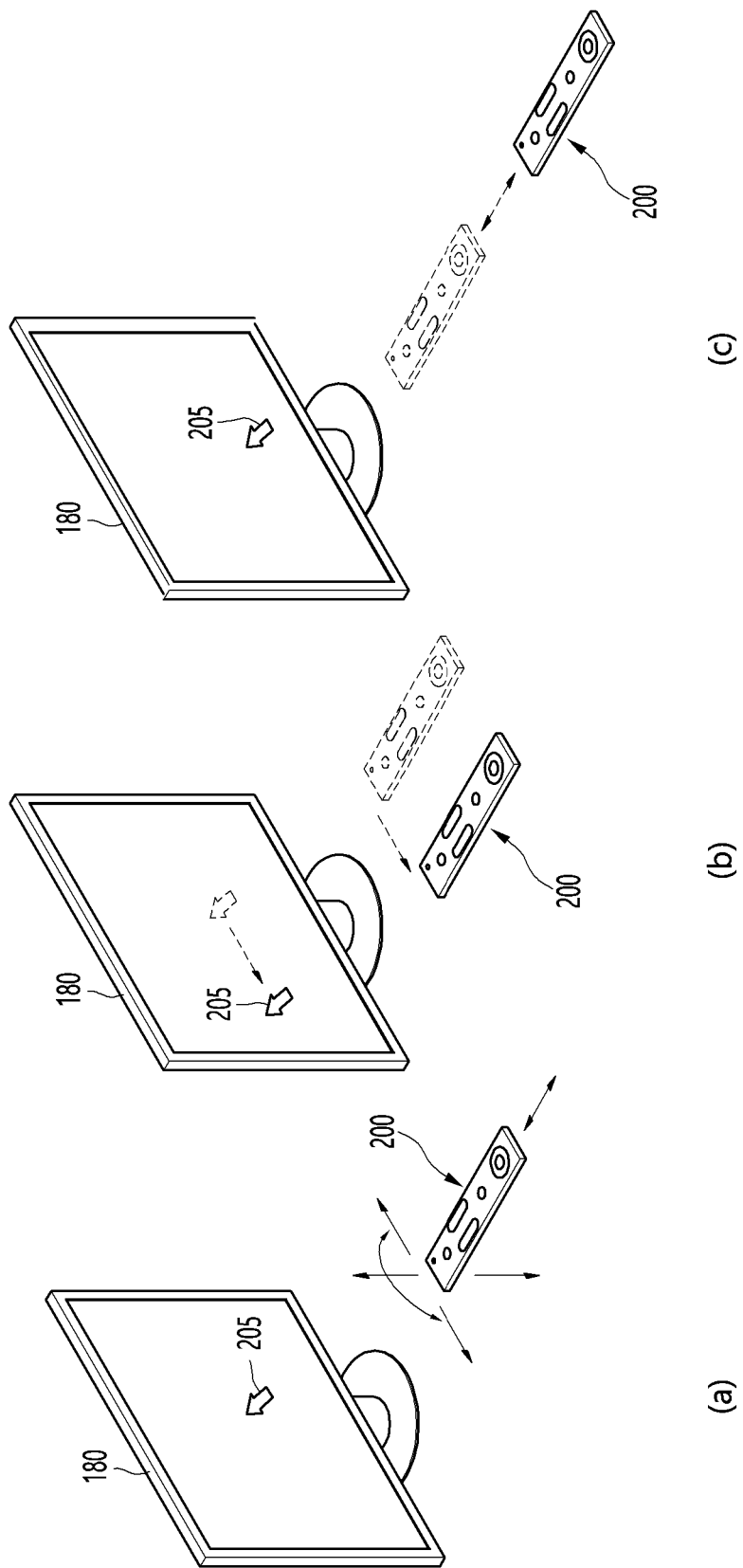
FIG. 4 shows an example of using a remote control device according to an embodiment of the present disclosure.

FIG. 4 shows an example of using a remote control device according to an embodiment of the present disclosure.

In FIG. 4. (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

The display device 100 according to an embodiment of the present disclosure may control the external device 300 based on the control signal received from the remote control device 200.

Accordingly, the user of the display device 100 according to an embodiment of the present disclosure may control the external device 300 without having to have another remote control device for controlling the external device 300.

The method for controlling the external device 300 based on the control signal the display device 100 receives from the remote control device 200 may vary. For example, the control mode of the display device 100 may include an IR mode and a network mode.

The IR mode may be a mode in which the display device 100 controls the external device 300 through the remote control device 200. Specifically, the IR mode may be a mode in which, when the display device 100 receives the control signal from the remote control device 200, a key code corresponding to the control signal is transmitted to the remote control device 200.

Figure 6:
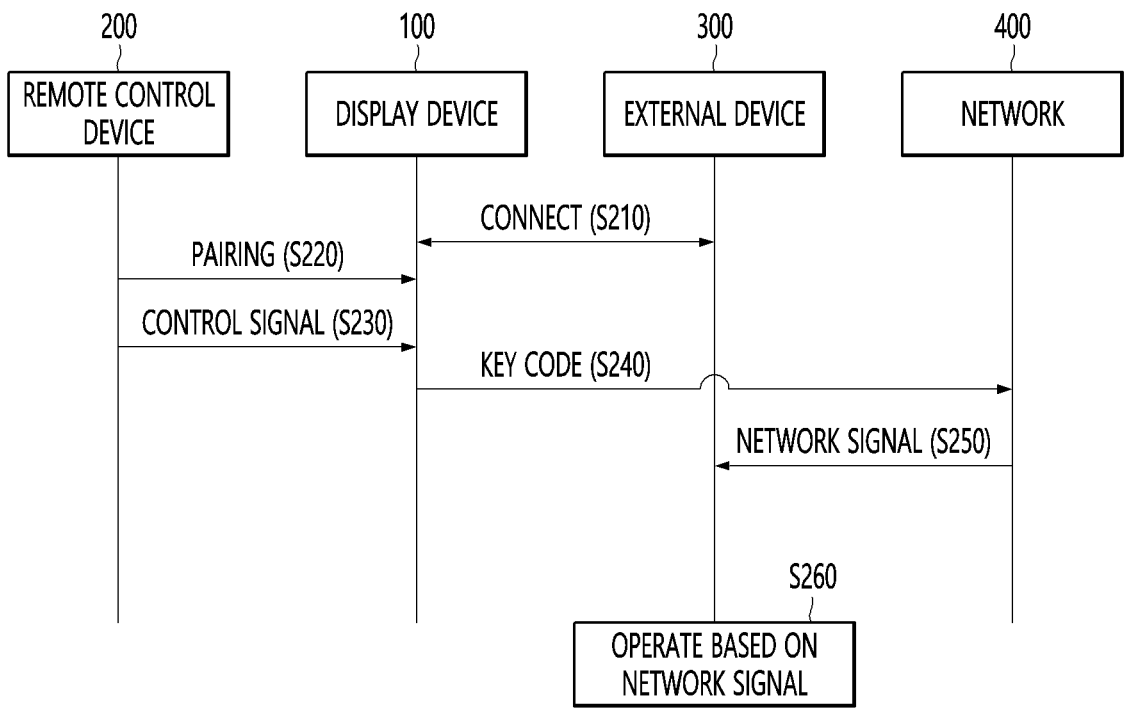
FIG. 6 is a ladder diagram for describing a method for operating a display device in a network mode according to an embodiment of the present disclosure.

The network mode may be a mode in which the display device 100 controls the external device 300 through a network (see 400 of FIG. 6). Specifically, the network mode may be a mode in which, when the display device 100 receives the control signal from the remote control device 200, a key code corresponding to the control signal is transmitted to the network (see 400 of FIG. 6).

Subsequently, the IR mode and the network mode will be described in more detail with reference to FIGS. 5 and 6, respectively.

First, the method for controlling the external device 300 by operating the display device 100 in the IR mode according to an embodiment of the present disclosure will be described with reference to FIG. 5.

Figure 5:
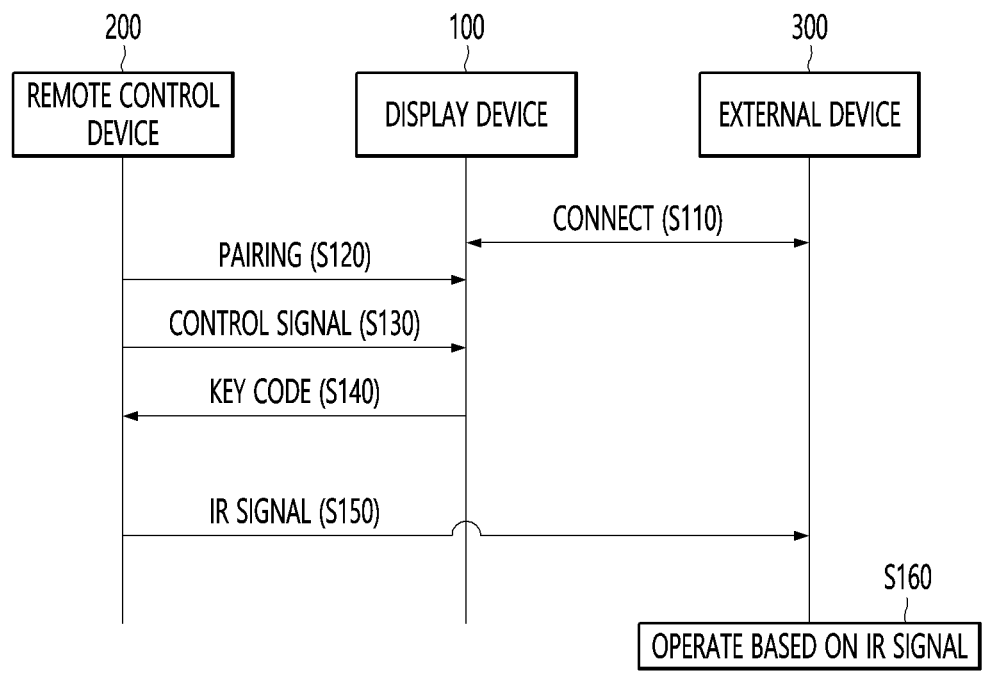
FIG. 5 is a ladder diagram for describing a method for controlling an external device by operating a display device in an IR mode according to an embodiment of the present disclosure.

FIG. 5 is a ladder diagram for describing a method for controlling an external device by operating a display device in an IR mode according to an embodiment of the present disclosure.

The display device 100 may be connected to at least one external device 300 (S110).

The display device 100 may be connected to the at least one external device 300 through the external device interface 135.

For example, the display device 100 and the external device 300 may be connected using a High-Definition Multimedia Interface (HDMI).

When connected to the external device 300, the display device 100 may transmit and receive data to and from the external device 300.

For example, when the display device 100 and the external device 300 are connected to each other by using the HDMI, the display device 100 may transmit Extended Display Identification Data (EDID) to the external device 300. In addition, the display device 100 may receive a Source Product Description (SPD) from the external device 300.

The EDID may be data including information related to the display device 100. Specifically, the EDID may include a manufacturer, specification, model number, supported resolution, and the like of the display device 100. The display device 100 may transmit the EDID to the external device 300 in order to receive content data from the external device 300 in a supportable format.

The SPD may be data including information related to the external device 300. For example, the SPD may include information relating to a product name, specification, technical drawings, manufacturing process, quality control procedure, testing requirements, packaging, and labeling requirements, and the like. The display device 100 may identify the external device 300 based on the SPD received from the external device 300.

In addition, the display device 100 may identify the external device 300 based on data received from the external device 300.

The display device 100 may obtain a key list for controlling the identified external device 300 from an external server (not shown).

The key list may be a list of key codes for controlling the external device 300. The key list may be different for each type or model of the external device 300. The key list may include each key code corresponding to each of the various operations of the external device 300.

On the other hand, the key list may be prestored in the display device 100. When the prestored key list corresponds to the identified external device 300, the display device 100 may control the external device 300 by using the prestored key list.

The display device 100 may perform pairing with the remote control device 200 (S120).

The display device 100 may perform pairing with the remote control device 200 through the wireless communication interface 173.

The display device 100 paired with the remote control device 200 may communicate with the remote control device 200 by using a Bluetooth scheme.

The display device 100 may receive the control signal from the remote control device 200 (S130).

The remote control device 200 may transmit the control signal to the display device 100 when there is the user input of controlling the external device.

The control signal received from the remote control device 200 by the display device 100 may be different for each user input to the remote control device 200.

For example, when there is a push operation of pushing a channel up button 237-1 of the channel change button 237 of the remote control device 200, the display device 100 may receive a first control signal corresponding to the channel up operation from the remote control device 200.

In addition, when there is a push operation of pushing a channel down button 237-2 of the channel change button 237 of the remote control device 200, the display device 100 may receive a second control signal corresponding to the channel down operation from the remote control device 200.

The display device 100 may transmit the key code to the remote control device 200 based on the control signal received from the remote control device 200 (S140).

The key code for controlling the external device 300 may be different for each operation of the external device 300. For example, the key code for changing the channel of the external device 300 up and the key code for changing the channel of the external device 300 down may be different from each other.

The display device 100 may transmit, to the remote control device 200, the key code corresponding to the control signal received from the remote control device 200. The display device 100 may transmit the key code to the remote control device 200 by using a Bluetooth scheme.

For example, when the display device 100 receives the first control signal from the remote control device 200, the display device 100 may transmit, to the remote control device 200, the first key code corresponding to the first control signal. The first key code may be a key code corresponding to the channel up operation.

In addition, when the display device 100 receives the second control signal from the remote control device 200, the display device 100 may transmit the second key code corresponding to the second control signal to the remote control device 200. The second key code may be a key code corresponding to the channel down operation.

The remote control device 200 may transmit an IR signal to the external device 300 based on the key code received from the display device 100 (S150).

The remote control device 200 may receive the key code from the display device 100 and generate the IR signal based on the received key code.

The IR signal generated by the remote control device 200 may be different for each key code received from the display device 100.

For example, when the remote control device 200 receives the first key code from the display device 100, the remote control device 200 may generate a first IR signal. The first IR signal may be an IR signal corresponding to the channel up operation.

In addition, when the remote control device 200 receives the second key code from the display device 100, the remote control device 200 may generate a second IR signal. The second IR signal may be an IR signal corresponding to the channel down operation.

The remote control device 200 may transmit the generated IR signal to the external device 300. Specifically, the remote control device 200 may transmit the IR signal to the external device 300 through the IR circuit 223.

The external device 300 may operate based on the IR signal received from the remote control device 200 (S160).

The operation of the external device 300 may be controlled differently for each IR signal received from the remote control device 200.

For example, when the external device 300 receives the first IR signal from the remote control device 200, the external device 300 may perform the channel up operation.

In addition, when the external device 300 receives the second IR signal from the remote control device 200, the external device 300 may perform the channel down operation.

In summary of FIG. 5, when the display device 100 operates in the IR mode, the external device 300 may operate based on the IR signal received from the remote control device 200.

When the display device 100 operates in the IR mode, the display device may control the external device 300 by using the remote control device 200 even when the display device 100 and the external device 300 are not connected to the network.

However, when there is an obstacle between paths through which the remote control device 200 and the external device 300 transmit and receive the IR signals, the external device 300 may not receive the IR signals. Accordingly, the control of the external device 300 may not be performed.

Next, the method for controlling the external device 300 by operating the display device 100 in the network mode according to an embodiment of the present disclosure will be described with reference to FIG. 6.

FIG. 6 is a ladder diagram for describing a method for operating a display device in a network mode according to an embodiment of the present disclosure.

Operations S210 to S230 may be the same as operations S110 to S130 of FIG. 5. For operations S210 to S230, descriptions redundant to those of FIG. 5 are omitted.

The display device 100 may transmit a key code to the network 400 based on a control signal received from the remote control device 200 (S240).

The display device 100 may transmit, to the network 400, the key code corresponding to the control signal received from the remote control device 200. The display device 100 may transmit the key code to the network connected through the network interface 133. The display device 100 may transmit the key code to the remote control device 200 by using a wireless network scheme.

For example, when the display device 100 receives the first control signal from the remote control device 200, the display device 100 may transmit, to the network 400, the first key code corresponding to the first control signal. The first key code may be a key code corresponding to the channel up operation.

In addition, when the display device 100 receives the second control signal from the remote control device 200, the display device 100 may transmit, to the network 400, the second key code corresponding to the second control signal. The second key code may be a key code corresponding to the channel down operation.

The network 400 may transmit a network signal to the external device 300 based on the key code received from the display device 100 (S250).

The network 400 may receive the key code from the display device 100 and generate the network signal based on the received key code.

The network signal generated by the network 400 may be different for each key code received from the display device 100.

For example, when the network 400 receives the first key code from the display device 100, the network 400 may generate a first network signal. The first network signal may be a network signal corresponding to the channel up operation.

In addition, when the network 400 receives the second key code from the display device 100, the network 400 may generate a second network signal. The second network signal may be a network signal corresponding to the channel down operation.

The network 400 may transmit the generated network signal to the external device 300. For example, the network 400 may the network signals to the external device 300 by using a wireless network scheme.

The display device 100 and the external device 300 may be connected to the same network. For example, the display device 100 and the external device 300 may be connected to the same network through the same access point (not shown).

The external device 300 may operate based on the network signal (S260).

The operation of the external device 300 may be controlled differently for each the network signal received from the network 400.

For example, when the external device 300 receives the first network signal from the network 400, the external device 300 may perform the channel up operation.

In addition, when the external device 300 receives the second network signal from the network 400, the external device 300 may perform the channel down operation.

In summary of FIG. 6, when the display device 100 operates in the network mode, the external device 300 may operate based on the network signal received from the network 400.

When the display device 100 operates in the network mode, there is an advantage in that the external device 300 may be controlled more quickly than when the display device 100 operates in the IR mode.

In addition, when the display device 100 operates in the network mode, the display device 100 may control the external device 300 regardless of whether there is an obstacle between the remote control device 200 and the external device 300. That is, when the display device 100 operates in the network mode, there is an advantage in that physical limitations may be minimized.

However, predetermined conditions may need to be satisfied in order for the display device 100 to operate in the network mode and control the external device 300.

For example, the display device 100 and the external device 300 have to be connected to the same network. In addition, the network 400 has to be in a state of capable of smoothly transmitting the network signals. In addition, the external device 300 has to be a device that may be controlled by the network signal.

When predetermined conditions are not satisfied, it may be difficult for the display device 100 to control the external device 300 in the network mode.

The display device 100 according to an embodiment of the present disclosure aims to automatically provide an appropriate control mode among an IR mode and a network mode according to the use environment of the display device 100 or the external device 300.

This is described with reference to FIG. 7.

Figure 7:
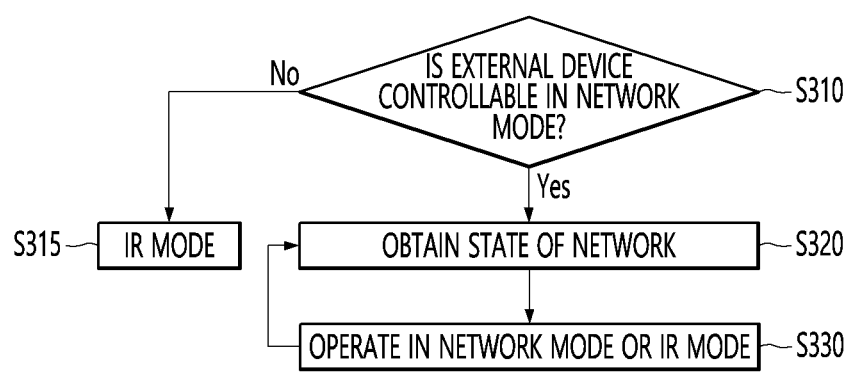
FIG. 7 is a flowchart for describing a method for setting a control mode in a display device according to an embodiment of the present disclosure.

FIG. 7 is a flowchart for describing a method for setting a control mode in a display device according to an embodiment of the present disclosure.

The controller 170 may obtain whether the external device 300 is an external device that may be controlled in a network mode (S310).

The controller 170 may obtain whether the external device 300 connected to the display device 100 is an external device that may be controlled in a network mode.

The controller 170 may obtain whether the external device 300 is controllable in the network mode, based on the data received from the external device 300. For example, the controller 170 may obtain whether the external device 300 is controllable in the network mode, based on the SPD received from the external device 300.

The controller 170 may store a list of external devices controllable in the network mode or may receive a list from an external server (not shown).

When the list of external devices controllable in the network mode includes the external device 300 connected to the display device 100, the controller 170 may obtain the external device 300 as a device controllable in the network mode.

The controller 170 may store whether the external device 300 is a device controllable in the network mode. Accordingly, the controller 170 may omit operation S310 when the external device 300 is a device that has been connected to the display device 100.

When the controller 170 obtains the external device 300 as a device uncontrollable in the network mode, the device may operate in the IR mode (S315).

When the controller 170 obtains the external device 300 as a device controllable in the network mode, the controller 170 can obtain a state of the network (S320).

The controller 170 may obtain information related to the state of the network and obtain the state of the network based on the obtained information.

The information related to the state of the network may include traffic volume of the network, signal strength of the network, response waiting time of the network, and the like.

The traffic volume of the network may be the amount of data transmitted over the network. The communication over the network may not be smooth as the amount of data transmitted over the network increases.

The signal strength of the network may be weaker as the distance between the controller 170 and the access point (not shown) increases. The communication over the network may not be smooth as the signal strength of the network is weak.

The response waiting time of the network may be the time required until the controller 170 receives a response to the requested data. A longer response waiting time of the network may mean that communication over the network is not smooth.

On the other hand, the above-described information related to the state of the network is only an example. The information related to the state of the network may include various types of information related to network quality, speed, stability, and the like.

The information related to the state of the network may include a variety of information that may affect the state of the network, such as the number of wireless networks in a place where the display device 100 is provided, the number of other electronic devices, and frequency bands.

The controller 170 may obtain two separate states of the network.

For example, the controller 170 may obtain a normal state or an abnormal state as the state of the network. The normal state may be a state in which the communication over the network is smoother than the abnormal state.

The controller 170 may preset a reference value that is a criterion for classifying the state of the network into the normal state or the abnormal state. The reference value may be a value that is preset as a value at which the network signal for controlling the external device 300 can be smoothly transmitted and received through the network 400.

The reference value may be different according to the type of information related to the state of the network obtained by the controller 170. The reference value may include at least one of reference traffic volume, reference signal strength, and reference waiting time.

When the traffic volume of the network is obtained, the controller 170 may classify the state of the network into the normal state or the abnormal state based on the reference traffic volume.

When the signal strength of the network is obtained, the controller 170 may classify the state of the network into the normal state or the abnormal state based on the reference signal strength.

When the response waiting time of the network is obtained, the controller 170 may classify the state of the network into the normal state or the abnormal state based on the reference waiting time.

The controller 170 may obtain the state of the network as the abnormal state when the traffic volume of the network is greater than or equal to a preset reference traffic volume, and/or when the signal strength of the network is less than a preset reference signal strength, and/or when the response waiting time of the network is greater than or equal to the preset reference waiting time.

On the other hand, the method for obtaining two separate states of the network by the controller 170 and the method for setting the criterion for dividing the state of the network are not limited thereto and may vary according to embodiments.

The controller 170 may operate in the network mode or the IR mode (S330).

The controller 170 may operate in the network mode or the IR mode based on the obtained state of the network.

When the controller 170 obtains the state of the network as the normal state, the controller 170 may operate in the network mode. The normal state may be a state in which communication over the network is smooth. Accordingly, the controller 170 may control the external device 300 by operating in the network mode using the network 400.

The controller 170 may operate in the IR mode when the state of the network is obtained as the abnormal state. The abnormal state may be a state in which communication over the network is not smooth. Accordingly, the controller 170 may control the external device 300 by operating in the IR mode not using the network 400.

While operating in the IR mode or the network mode, the controller 170 may return to operation S320 to obtain the state of the network again. The controller 170 may obtain the state of the network multiple times during the operation of the display device 100.

The controller 170 may change the control mode based on the obtained state of the network.

For example, when the state of the network is obtained as the normal state while operating in the IR mode, the controller 170 may change the control mode to the network mode. Alternatively, when the state of the network is obtained as the abnormal state while operating in the network mode, the controller 170 may change the control mode to the IR mode.

Accordingly, when the state of the network is changed, the controller 170 may change the control mode according to the changed state of the network.

In summary of FIG. 7, the display device 100 according to an embodiment of the present disclosure may set or change the control mode based on the state of the network.

Accordingly, the display device 100 according to an embodiment of the present disclosure may automatically provide the most suitable control mode by reflecting the state of the network.

However, when the state of the network frequently changes, the control mode of the display device 100 may also change frequently. When the control mode changes frequently, control errors may occur.

For example, when the display device 100 obtains the abnormal state of the network, the control mode may be changed from the network mode to the IR mode. The display device 100 may transmit the key code to the network 400 when receiving the control signal from the remote control device 200 before the change to the IR mode is completed. However, since the network is in the abnormal state, the control of the external device 300 using the network 400 may fail.

Accordingly, when the state of the network changes frequently, the display device 100 according to an embodiment of the present disclosure may minimize the possibility of occurrence of control errors by operating in consideration of the unstable state of the network.

This is described with reference to FIG. 8.

Figure 8:
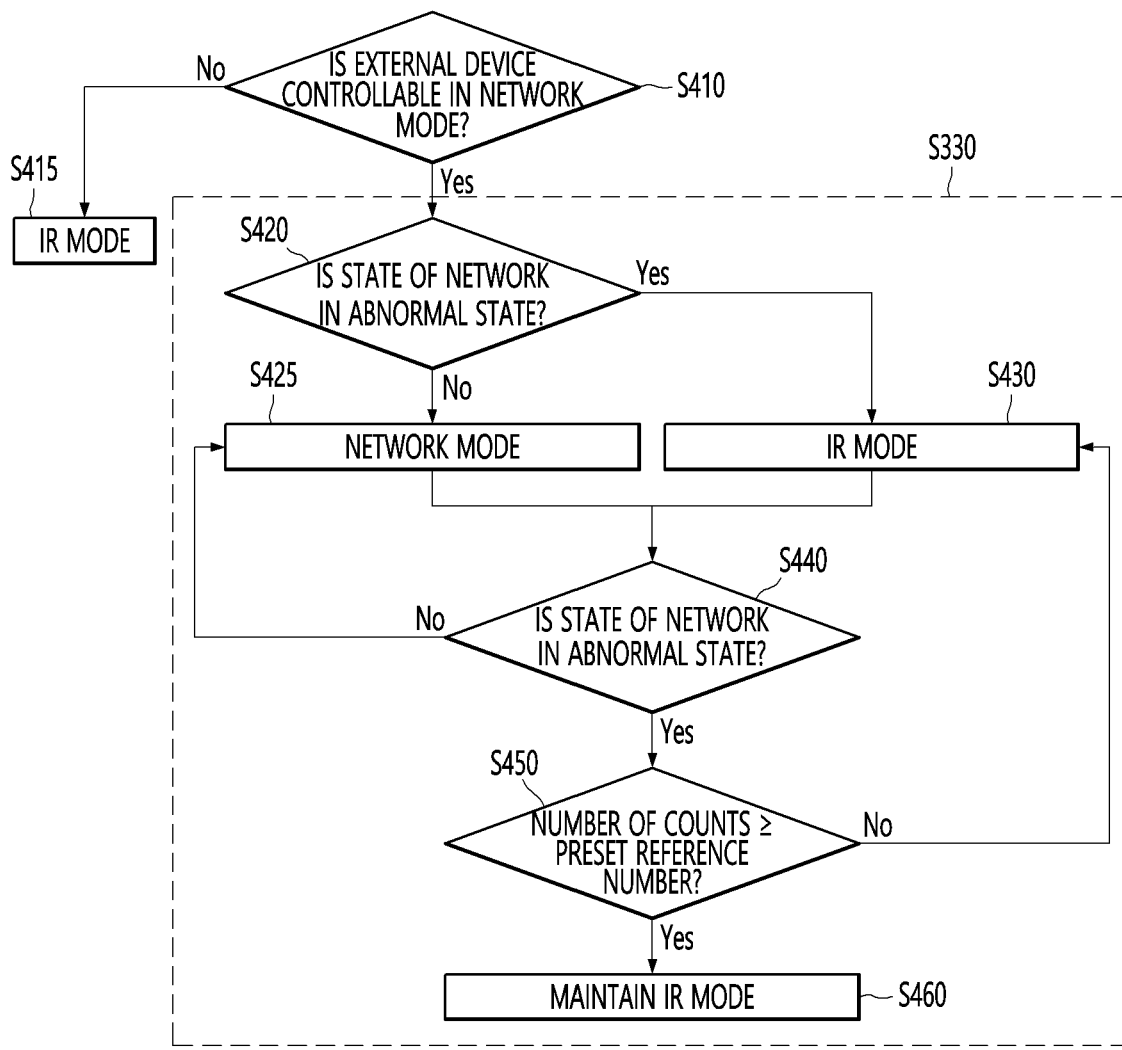
FIG. 8 is a flowchart for describing a method for changing or maintaining a control mode in a display device according to an embodiment of the present disclosure.

FIG. 8 is a flowchart for describing a method for changing or maintaining a control mode in a display device according to an embodiment of the present disclosure.

Operations S410 to S415 of FIG. 8 may be the same as operations S310 to S315 of FIG. 7. Operations S420 to S460 of FIG. 8 may be operations that embody operation S330 of FIG. 7.

The controller 170 may obtain whether a state of a network is in an abnormal state (S420).

Since the method for obtaining the state of the network by the controller 170 is the same as the method described in operation S320 of FIG. 7, redundant descriptions thereof are omitted.

When the controller 170 obtains that the state of the network is not abnormal, the controller 170 may operate in the network mode (S425). When the controller 170 obtains the state of the network as the normal state, the controller 170 may operate in the network mode.

The controller 170 may operate in the IR mode when the state of the network is obtained as the abnormal state (S430).

The controller 170 may re-obtain whether the state of the network is in the abnormal state while operating in the network mode or the IR mode (S440).

The controller 170 may obtain the state of the network multiple times during the operation of the display device 100. The controller 170 may periodically obtain the state of the network.

The period in which the controller 170 obtains the state of the network may be a period preset in consideration of the use environment of the display device 100.

For example, the period for obtaining the state of the network is a period preset in consideration of the number of other electronic devices (not shown) and the number of other access points (not shown) disposed in the place where the display device 100 is provided.

As the number of other electronic devices (not shown) or other access points (not shown) disposed in the place where the display device 100 is provided increases, communication between the display device 100 and the network 400 may be interrupted. In this case, it may be highly likely that the state of the network will change.

Therefore, as the number of other electronic devices (not shown) or other access points (not shown) disposed in the place where the display device 100 is provided increases, the period for obtaining the change in state of the network may be set to be short.

According to an embodiment, the controller 170 may obtain the state of the network when a predetermined time elapses from the time of changing the control mode. The time when the controller 170 changes the control mode may be the time when the state of the network changes. After the state of the network changes, it may be highly likely the state of the network will change again. Therefore, the controller 170 may obtain the state of the network when a predetermined time elapses from the time of changing the state of the network. The preset time may be a time determined in consideration of various use environments of the display device 100 or a time determined by a user input.

On the other hand, according to an embodiment, the predetermined time or the period for the controller 170 to obtain the state of the network may be determined according to the user input.

The controller 170 may operate in the network mode when the state of the network other than the abnormal state is obtained. When the controller 170 obtains the state of the network as the normal state, the controller 170 may operate in the network mode.

The controller 170 may count the number of times the state of the network is obtained as the abnormal state (S450).

The controller 170 may count the number of times the state of the network is obtained as the abnormal state from the time point when the state of the network is first obtained. Alternatively, the controller 170 may count the number of times the state of the network is obtained as the abnormal state from the time point when the state of the network is first obtained as the abnormal state.

The controller 170 may add 1 to the number of counts whenever the state of the network is obtained as the abnormal state.

For example, when the controller 170 obtains the state of the network as the abnormal state at a first time point when the controller 170 starts obtaining the state of the network, the number of counts may be 1.

When the controller 170 obtains the state of the network as the normal state at a second time point later than the first time point, the number of counts may be 1.

When the controller 170 obtains the state of the network as the abnormal state at a third time point later than the second time point, the number of counts may be 3.

On the other hand, according to an embodiment, the controller 170 may not count the abnormal state obtained a predetermined time prior to the current time point. Accordingly, the controller 170 may not count the abnormal state unrelated to the current state of the network.

The controller 170 may obtain whether the number of counts is greater than or equal to a predetermined reference number (S370).

The preset reference number may be a value set to prevent control errors due to an excessive change of the control mode.

Since the number of counts increases by 1 whenever the state of the network is obtained as the abnormal state, a larger number of counts may mean that the state of the network is unstable.

As will be described below, the controller 170 may maintain the control mode when the number of counts is less than the preset reference number, and change the control mode based on the state of the network when the number of counts is equal to or greater than the preset reference number.

That is, the preset reference number may be a value used as a reference number for determining whether to maintain or change the control mode when the state of the network is unstable.

The controller 170 may operate in the IR mode when the number of counts is less than a predetermined reference number.

The controller 170 may maintain the IR mode when the number of counts is greater than or equal to the predetermined reference number (S380).

Specifically, the controller 170 may maintain the IR mode when the number of counts while operation in the IR mode is greater than or equal to the predetermined reference number.

Alternatively, the controller 170 may change the control mode to the IR mode and maintain the changed control mode when the number of counts while operation in the network mode is greater than or equal to the predetermined reference number.

The controller 170 may maintain the IR mode until the power of the display device 100 is terminated. When the controller 170 maintains the control mode, the controller 170 may not obtain the state of the network again. Accordingly, there is an advantage in minimizing unnecessary calculations during the operation of the display device 100.

On the other hand, the method by which the display device 100 maintains or changes the control mode based on the state of the network is not limited to that described in operation S450 and may vary.

For example, according to another embodiment of the present disclosure, the controller 170 may maintain or change the control mode based on a ratio of the number of counts to the total number of times the state of the network is obtained. As the state of the network becomes more unstable, the ratio of the number of counts may increase. Accordingly, the controller 170 may maintain the control mode as the IR mode when the ratio of the number of counts is greater than or equal to a predetermined reference ratio.

In addition, according to another embodiment of the present disclosure, the controller 170 may maintain or change the control mode based on an interval between time points when the state of the network is obtained as the abnormal state. The controller 170 may obtain the state of the network as the abnormal state at both the first time point and the second time point subsequent to the first time point. As the state of the network becomes more unstable, the distance between the first time point and the second time point may be shorter. Accordingly, the controller 170 may maintain the control mode as the IR mode when the interval between the first time point and the second time point is less than a preset interval.

In summary of FIG. 8, the display device 100 according to an embodiment of the present disclosure may not change the control mode to the network mode even when the network temporarily has a normal state.

Accordingly, the display device 100 may prevent frequent change of the control mode, thereby minimizing control errors. In addition, the display device 100 may maintain the control mode as the IR mode that does not use the network, thereby stably controlling the external device 300 regardless of the state of the network.

According to an embodiment of the present disclosure, the above-described method can be implemented with codes readable by a processor on a medium in which a program is recorded. Examples of the processor-readable medium may include read-only memory (ROM), random access memory (RAM), compact disc read-only memory (CD-ROM), magnetic tape, floppy disk, and optical data storage device.

The display device described above is not limitedly applicable to the configurations and methods of the above-described embodiments, and the embodiments are configured by selectively combining all or part of the embodiments such that various modifications can be made.

What is claimed is:

1. A display device comprising:
a network interface connected to a network;
an external device interface connected to at least one external device;
a wireless communication interface configured to perform pairing with a remote control device; and
a controller configured to obtain a state of the network as a normal state or an abnormal state, count a number of times the state of the network is obtained as the abnormal state, and maintain or change a control mode for controlling the external device, based on the number of times,
wherein the control mode includes an infrared (IR) mode and a network mode, and
wherein the controller is configured to maintain the IR mode or change to the IR mode when the number of times is greater than or equal to a predetermined reference number.

2. The display device of claim 1, wherein the controller is configured to maintain the IR mode when the number of times is greater than or equal to the predetermined reference number while operation in the IR mode.

3. The display device of claim 1, wherein the controller is configured to change the control mode to the IR mode and maintain the changed control mode when the number of times is greater than or equal to the predetermined reference number while operating in the network mode.

4. The display device of claim 1, wherein the controller is configured to maintain or change the control mode based on a ratio of the number of times to a total number of times the state of the network is obtained.

5. The display device of claim 1, wherein the controller is configured to maintain or change the control mode based on an interval between a first time point and a second time point when the state of the network is obtained as the abnormal state at the first time point and the second time point later than the first time point,
wherein the controller is configured to maintain the control mode as the IR mode when the interval between the first time point and the second time point is less than a preset interval.

6. The display device of claim 1, wherein the controller is configured to maintain the control mode until power of the display device is turned off.

7. The display device of claim 1, wherein the controller is configured to change the control mode based on the state of the network.

8. The display device of claim 7, wherein the controller is configured to change the control mode to the network mode when the state of the network is obtained as the normal state and to change the control mode to the IR mode when the state of the network is obtained as the abnormal state.

9. The display device of claim 1, wherein the controller is configured to:
transmit, to the remote control device, a key code corresponding to a first control signal when the controller operates in the IR mode and receives the first control signal from the remote control device; and
transmit, to the network, a key code corresponding to a second control signal when the controller operates in the network mode and receives the second control signal from the remote control device.

10. The display device of claim 1, wherein the controller is configured to obtain the state of the network based on information related to the state of the network, and
the information related to the state of the network includes at least one of traffic volume of the network, signal strength of the network, or response waiting time of the network.

11. The display device of claim 10, wherein the controller is configured to obtain the state of the network as the abnormal state when the traffic volume of the network is greater than or equal to a preset reference traffic volume, and/or when the signal strength of the network is less than a preset reference signal strength, and/or when the response waiting time of the network is greater than or equal to a preset reference waiting time.

* * * * *